(12) United States Patent
Markowski et al.

(10) Patent No.: US 6,696,882 B1
(45) Date of Patent: Feb. 24, 2004

(54) TRANSIENT OVERRIDE CIRCUIT FOR A VOLTAGE REGULATOR CIRCUIT

(75) Inventors: Piotr Markowski, Bellingham, MA (US); Mark S. Masera, Framingham, MA (US); Mark A. Jutras, Upton, MA (US)

(73) Assignee: Artesyn Technologies, Inc., Boca Raton, FL (US)

( * ) Notice: Subject to any disclaimer, the term of this patent is extended or adjusted under 35 U.S.C. 154(b) by 19 days.

(21) Appl. No.: 09/599,280

(22) Filed: Jun. 22, 2000

(51) Int. Cl.$^7$ ................................. G05F 3/02
(52) U.S. Cl. .................. 327/531; 327/530; 323/285; 323/290; 363/21.01; 363/65
(58) Field of Search .................. 327/101, 108, 327/530, 531; 363/21.01, 19, 65; 323/282, 283, 284, 285, 286, 289, 290

(56) References Cited

U.S. PATENT DOCUMENTS

| | | | |
|---|---|---|---|
| 4,975,823 A | * 12/1990 | Rilly et al. | 363/54 |
| 4,980,576 A | * 12/1990 | Rossi et al. | 327/109 |
| 5,144,156 A | * 9/1992 | Kawasaki | 327/157 |
| 5,159,543 A | * 10/1992 | Yamawaki | 307/110 |
| 5,406,468 A | * 4/1995 | Booth | 363/15 |
| 5,448,465 A | * 9/1995 | Yoshida et al. | 363/15 |
| 5,483,434 A | * 1/1996 | Seesink | 307/110 |
| 5,499,183 A | * 3/1996 | Kobatake | 327/536 |
| 5,731,694 A | * 3/1998 | Wilcox et al. | 323/224 |
| 5,886,508 A | * 3/1999 | Jutras | 323/267 |
| 5,929,692 A | 7/1999 | Carsten | |
| 5,982,222 A | * 11/1999 | Kyung | 327/536 |
| 6,016,260 A | * 1/2000 | Heeringa | 363/21 |
| 6,064,187 A | * 5/2000 | Redl et al. | 323/285 |
| 6,087,817 A | * 7/2000 | Varga | 323/282 |
| 6,140,808 A | * 10/2000 | Massie | 323/222 |
| 6,188,209 B1 | * 2/2001 | Poon et al. | 323/255 |
| 6,232,755 B1 | * 5/2001 | Zhang | 323/282 |
| 6,271,650 B1 | * 8/2001 | Massie et al. | 323/272 |
| 6,292,378 B1 | * 9/2001 | Brooks et al. | 323/272 |
| 6,356,063 B1 | * 3/2002 | Brooks | 323/284 |
| 6,414,469 B1 | * 7/2002 | Zhou et al. | 323/272 |

OTHER PUBLICATIONS

Panov et al., "Design Considerations for 12–V/1.5–V, 50–A Voltage Regulator Modules," *IEEE Applied Power Electronics Conference (APEC)*, Feb. 2000, pp. 39–46.

\* cited by examiner

*Primary Examiner*—Terry D. Cunningham
(74) *Attorney, Agent, or Firm*—Kirkpatrick & Lockhart LLP

(57) ABSTRACT

A circuit for providing a regulated voltage to a load. The circuit includes a power converter coupled to the load and including at least one pulse-width modulated switching device, a control circuit for providing a pulse-width modulated control signal to the pulse-width modulated switching device of the power converter based on an output voltage of the power converter, and a transient override circuit responsive to a load voltage for biasing the pulse-width modulated switching device conductive during certain load voltage conditions.

21 Claims, 3 Drawing Sheets

TRANSIENT OVERRIDE CIRCUIT FOR A VOLTAGE REGULATOR CIRCUIT

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF INVENTION

1. Field of Invention

The present invention relates generally to voltage regulation and, more particularly, to methods and devices for enhancing transient response for voltage regulator circuits.

2. Description of the Background

When precise voltage regulation is required for electronic components, and particularly for microprocessors, it is common to locate a specialized power supply module in close proximity to the voltage sensitive components. This configuration overcomes voltage drops that may be experienced in cables, printed wiring, and/or other connectors that are used to interconnect the power supply module and the voltage sensitive components, and is especially important in cases where the load current changes, thereby causing a change in the voltage drop. Power supply modules used in such applications are commonly referred to as "point of load" or "POL regulators."

A known POL regulator type is a synchronous buck regulator. Synchronous buck topologies are popular because the are very efficient and typically provide an acceptable performance/cost trade-off, especially when the output voltage of the regulator is less than the input voltage, which is a common requirement for many of today's microprocessors and other low-power electronics.

A buck regulator normally employs an inductor to convert the pulse width modulated (PWM) square waves generated by a control circuit of a synchronous buck converter to an average value. Nevertheless, the output voltage of the regulator may still exhibit a variable or ripple voltage superimposed on the DC output voltage. The magnitude of the ripple is inversely proportional to the inductance of the averaging inductor. Moreover, the response time of the POL regulator is limited by this inductance, as the load current can change at a rate inversely proportional to the inductance. Reducing the value of the inductance to allow the current to increase or decrease more rapidly will increase the ripple voltage. Therefore, there is a minimum value of inductance that can be used.

This situation becomes worse when the load current supplied to the electronic component changes at a fast rate. In these cases the resistance and the inductance of the intermediate connections create both steady-state and transient voltage drops. Normally, filter capacitance is provided at the output of the POL regulator, and current can be supplied or absorbed by these capacitors until the regulator can reach steady-state. Unfortunately, even the best capacitors have internal resistance and inductance that limits their ability to rapidly supply or absorb current.

Furthermore, the feedback control loop of the POL regulator is normally slowed to prevent oscillations. The cumulative effect is that the regulated output voltage can experience a substantial transient change before the regulator recovers. The maximum or minimum voltage during such transient conditions may be outside the limits for the electronic component, thus creating the possibility of a malfunction.

One known manner in which to overcome these drawbacks is to employ multiple buck regulators connected in parallel but operated such that the PWM signals of each regulator are synchronized and shifted in phase. Each buck converter can be designed with a reduced value of inductance, yet due to the overlapping ripple currents, the composite ripple voltage is acceptable. The parallel-connected buck regulators may share the load and have a common feedback loop. Typically two to four parallel-connected buck regulators are used.

The newest microprocessors, however, exhibit such high rates of change in current that even four interleaved buck regulators cannot operate effectively under transient conditions. The response time can be so long that the bypass capacitors substantially discharge to below the minimum required voltage before the POL regulator supplies sufficient current.

Accordingly, there exists a need for a manner in which to enhance the response time of voltage regulator in response to rapid changes in the load current, while at the same time preventing excessive ripple and closed loop instability.

BRIEF SUMMARY OF INVENTION

The present invention is directed to a circuit for providing a regulated voltage to a load. According to one embodiment, the circuit includes a power converter coupled to the load and including at least one pulse-width modulated switching device, a control circuit for providing a pulse-width modulated control signal to the pulse-width modulated switching device of the power converter based on an output voltage of the power converter, and a transient override circuit responsive to a load voltage for biasing the pulse-width modulated switching device conductive during certain load voltage conditions.

The voltage regulator circuit of the present invention provides enhanced transient response in comparison to prior art voltage regulator circuits because it decreases the amount of time it takes the circuit to ramp-up the current in the magnetic components of the regulator circuit in response to increased load current. Further, the present invention provides an advantage in that the transient response reaction time has no relation to the crossover frequency of the error signal loop as in prior control methods. As a result, the magnitude of the voltage drop in response to increased load current is reduced with the present invention. At the same time, the present invention permits the error amplifier bandwidth to be rolled off at a lower, more practical frequency, which thereby improves noise immunity and stability margins. In addition, the present invention permits the use of a reduced number of output filter capacitors or lower performance/less expensive output filter capacitors.

DESCRIPTION OF THE FIGURES

For the present invention to be clearly understood and readily practiced, the present invention will be described in conjunction with the following figures, wherein.

DETAILED DESCRIPTION OF THE INVENTION

Figure 1:
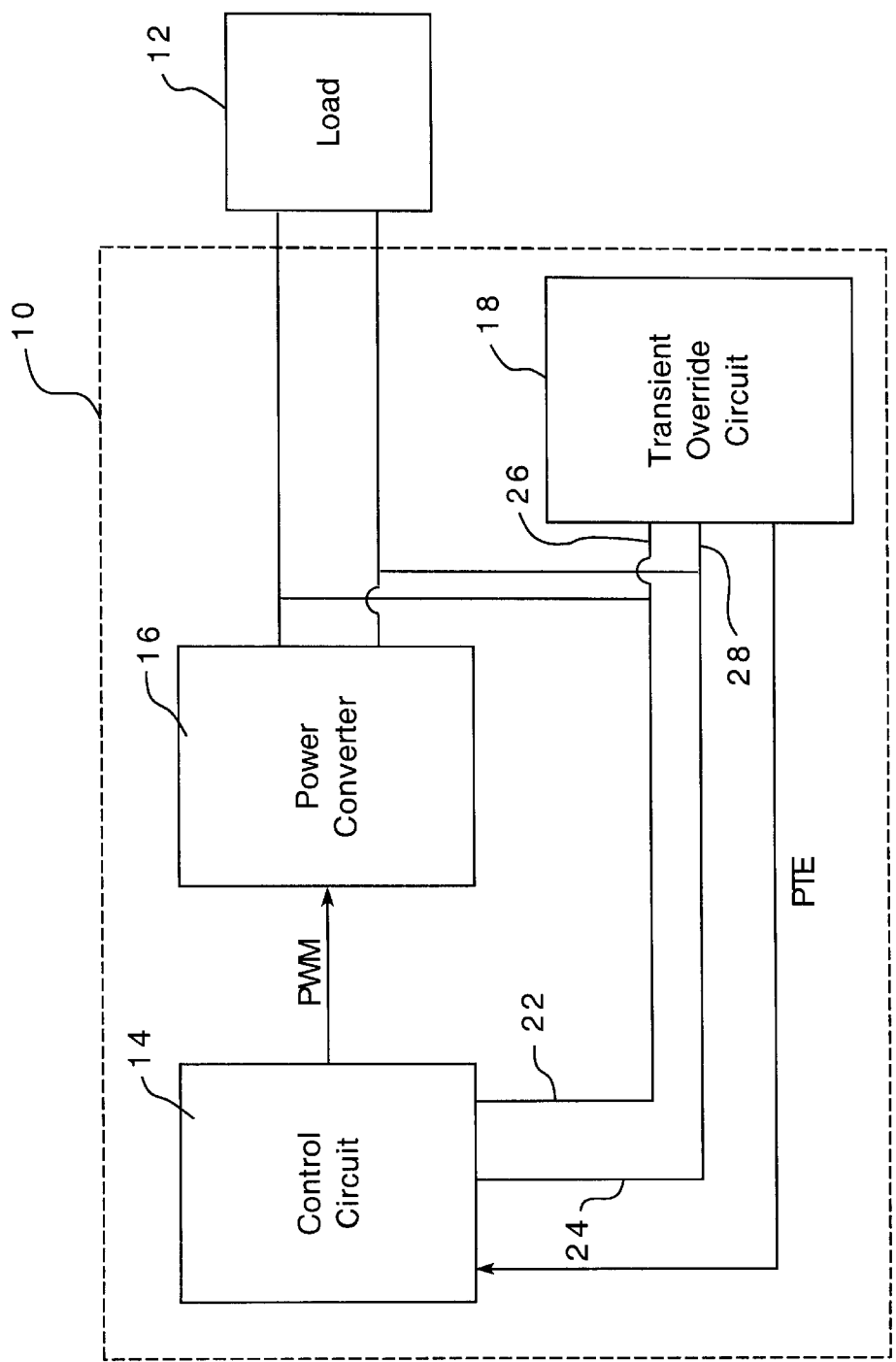
FIG. 1 is a block diagram of a voltage regulator circuit according to one embodiment of the present invention.

FIG. 1 is a block diagram of a voltage regulator circuit 10 for supplying power to a load 12 according to one embodiment of the present invention. The voltage regulator circuit 10 includes a control circuit 14, a power converter 16, and a transient override circuit 18. The load 12 may be any electronic component requiring regulated power including, for example, a microprocessor.

The power converter 16 may be, for example, any type of DC-DC power converter using pulse-width modulated switching to regulate the output voltage. For example, the power converter 16 may be a synchronous buck converter, multiple interleaved synchronous buck converters, or an isolated-stage forward converter. An embodiment of the present invention in which the power converter 16 includes four interleaved buck converters will be described in more detail hereinbelow with respect to FIG. 2. The output voltage of the power converter 16 is supplied to the load 12 via connectors 20.

The control circuit 14 outputs a pulse-width modulated (PWM) signal to the power converter 16 to bias a pulse-width modulated switching device of the power converter 16. The control circuit 14 has input terminals 22, 24 connected to the output terminals of the power converter 16. Based on the output voltage of the power converter 16, the control circuit 14 may vary the duty cycle of the pulse-width modulated (PWM) signal to regulate the output voltage supplied to the load 12 by the power converter 16.

The transient override circuit 18 also includes input terminals 26, 28 responsive to the load voltage. The transient override circuit 18 may monitor the load voltage and, under certain load voltage conditions, output a signal PTE to the control circuit 14 to override the control circuit 14 and rapidly force the pulse-width modulated switching devices of the power converter 16 to higher duty cycles. For example, the transient override circuit 18 may override the control circuit 14 when the output voltage supplied to the load 12 declines at a rate faster than a predetermined rate and when the magnitude of the output voltage drop is greater than a predetermined threshold voltage value. When such condition exists, the transient override circuit 18 overrides the control circuit 14, and the high duty cycle of the pulse-width modulated switching devices of the power converter 16 may be maintained until one of the conditions ceases to exist. Then, the transient override circuit 18 may relinquish control back to the control circuit 14 according to the feedback loop. Accordingly, the transient override circuit 18 permits the voltage regulator circuit 10 to respond rapidly to changes in the load current in a manner independent of the crossover frequency of the error signal loop.

Figure 2:
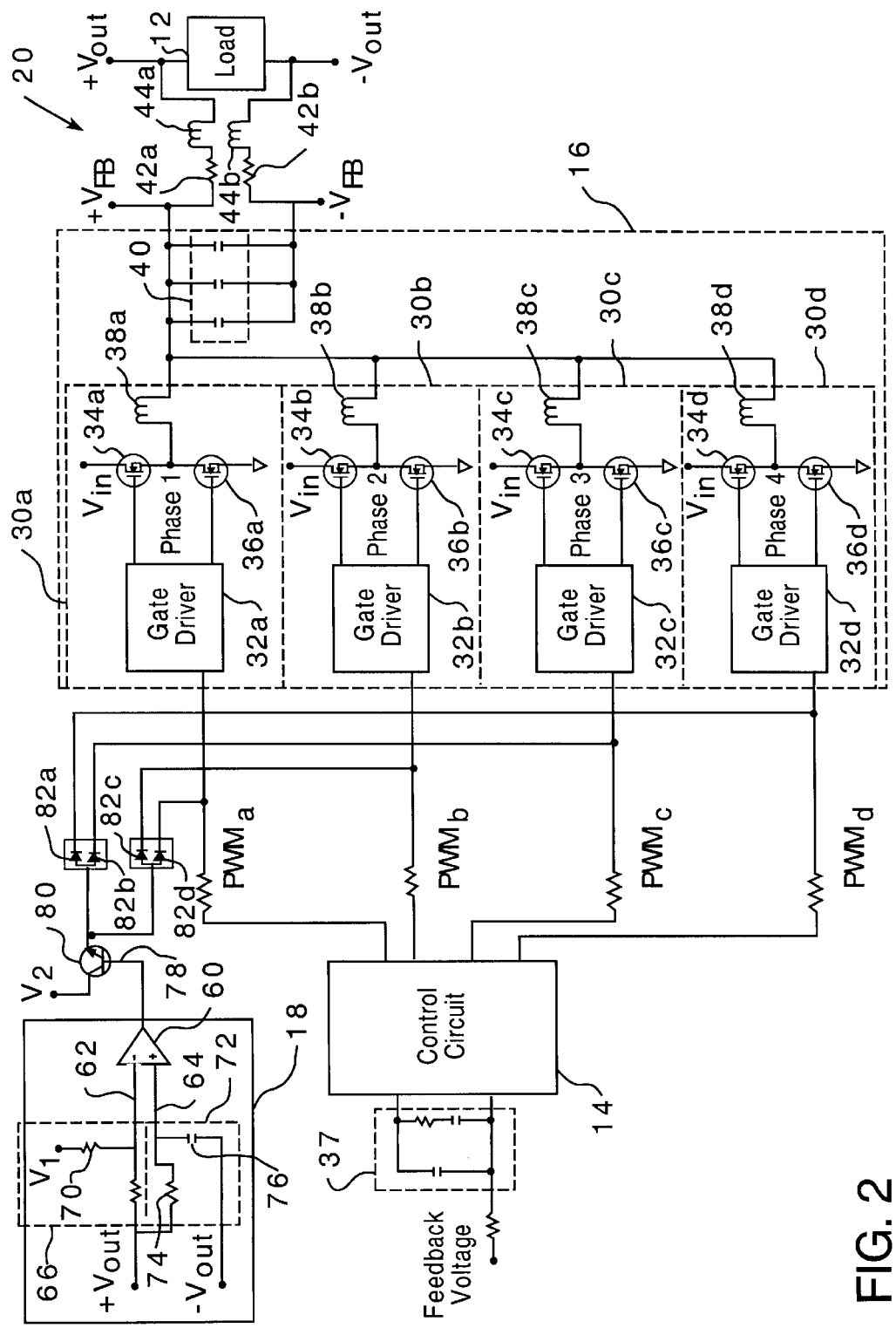
FIG. 2 is a schematic diagram of the voltage regulator circuit of FIG. 1 according to one embodiment of the present invention.

FIG. 2 is detailed schematic diagram of the voltage regulator circuit 10 of FIG. 1 according to one embodiment of the present invention. In FIG. 2, the power converter 16 includes four buck converters 30a–d with interleaved PWM switching to reduce ripple. Each of the buck converters 30a–d may include a gate driver 32a–d, a pair of pulse-width modulated switching devices 34a–d, 36a–d, and an output filter including an inductor 38a–d and output capacitors 40. (The dashed boxes illustrating each the buck regulators 30a–d in FIG. 2 do not include the output capacitors 40 because the output capacitors 40 are shared components for each of the buck regulators 30a–d for the illustrated embodiment). The pulse-width modulated switching devices 34a–d, 36a–d may be embodied as, for example, metal-oxide-semiconductor field effect transistor (MOSFETs). The gate drivers 32a–d may supply gate drive to the pulse-width modulated switching devices 34a–d, 36a–d, and may be embodied as integrated circuits such as, for example, one of the HIP series of gate drivers commercially available from Intersil Corp. Under normal operating conditions, the switching devices 34a–d of the buck converter operate as power switches, coupling the input voltage $V_{in}$ through the output filter when biased conductive. The switching devices 36a–d operate as synchronous rectifiers, maintaining continuous current through the inductors 38a–d when the switching devices 34a–d are turned off. The gate drivers 32a–d operate to ensure that both switching devices 34a–d 36a–d for the buck converters 30a–d are not simultaneously conducting.

The control circuit 14 may be a PWM control circuit which outputs interleaved PWM square wave control signals ($PWM_{a-d}$) to the buck converters 30a–d to control the duty cycles of the pulse-width modulated switching devices 34a–d, 36a–d based on the output voltage of power converter 16, as is known in the art. The feedback voltage signal supplied to the control circuit 14 may be indicative of the output voltage of the power converter 16 (i.e., the voltage difference between nodes +$V_{FB}$ and –$V_{FB}$). A loop compensation circuit 37 may be provided at the feedback voltage signal input of the control circuit 14. The control circuit 14 may be embodied as, for example, an integrated circuit such as, for example, one of the HIP2000 series of PWM controllers commercially available from Intersil Corp. The different PWM signals output from the control circuit 14 to the power converter 16 may be out of phase with each other. For example, for the embodiment illustrated in FIG. 2 including four synchronous buck converters 30-deach $PWM_{a-d}$ signal may be phase-shifted ninety degrees.

The load 12 is connected to the output of the power converter 16 by the connectors 20, whose resistance and inductance are modeled as resistors 42a,b and inductors 44a,b. The connectors 20 may be, for example, cables or printed wiring.

The transient override circuit 18 includes a comparator 60. The input terminals 62, 64 of the comparator 60 may be responsive to the load voltage. The first input terminal 62 is coupled to an output terminal (+$V_{out}$) of the voltage regulator circuit 10 via a resistor network 66, including resistors 68, 70. The resistor 70 of the network 66 is also connected to voltage rail $V_1$. The second input terminal 64 of the comparator 60 is coupled to the output terminals of the voltage regulator circuit 10 via a delay circuit 72, including a resistor 74 and a capacitor 76. The resistor 74 is coupled to a first of the output terminals (+$V_{out}$) of the voltage regulator circuit 10, and the capacitor 76 is coupled to a second of the output terminals (–$V_{out}$) of the voltage regulator circuit 16.

The output of the transient override circuit 18 is connected to a control terminal 78 of a switch 80. The switch 80 may be a transistor such as, for example, a bipolar junction device, as illustrated in FIG. 2, or a field-effect device, such as a MOSFET or a JFET. The switch 80, which may amplify the signal from the transient override circuit 18, is connected to a number of diodes 82a–d, each having their cathode terminal connected to the switch 80 and their anode terminal connected to one of the PWM output signals ($PWM_{a-d}$) of the control circuit 14.

In operation, according to one embodiment, when no rapid changes in the load current are present, the power converter 16 operates under the feedback control loop associated with the control circuit 14 according to the standard mode of operation defined by the topology of the power converter 16. Under these conditions, the transient override circuit 18 is inactive, and the output of the comparator 60 is in the "low" state. Consequently, the switch 80 is not biased and the diodes 82a–d are either reversed biased or not biased, depending on the voltage level of the particular PWM signal (PWM$_{a-d}$) output from the control circuit 14. The voltage at the input terminal 64 of the comparator 60 follows the load voltage via the filtering provided by the delay circuit 72. The voltage at the input terminal 62 also follows the load voltage, but is upward biased by the resistor network 66. The degree of upward bias is determined by the values of resistors 68, 70 and the voltage of voltage rail $V_1$.

When the current drawn by the load 12 begins to increase, the load voltage starts to decrease because of the voltage drop across the connectors 20 and the parasitic capacitance of the output capacitors 40. In response, the control circuit 14 starts to increase the duty cycle of the pulse-width modulated switching devices 34a–d, 36a–d of the buck converters 30a–d in order to restore the desired output voltage level of the power converter 16. If the current rises very quickly, however, the speed of the feedback loop, limited by stability requirements, is not sufficient to compensate for the voltage drop.

The voltage at the input terminal 64 of the comparator 60 remains substantially unchanged due to the capacitor 76 maintaining the value of the average output voltage. The voltage at the input terminal 62, however, decreases because it follows the load voltage. If the load voltage decline continues, the voltage at the input terminal 62 becomes lower than at the input terminal 64, thereby causing the output terminal of the comparator 60 to transition to a "high" state, thus biasing the switch 80 conductive and forcing all of the input terminals of the gate drivers 32a–d high via the diodes 82a–d. As a result, all phases are turned on and remain on regardless of the state of the control circuit 14. Thus, the transient override circuit 18 effectively overrides the control circuit 14, forcing all four buck converters 30a–d to simultaneously ramp up current in output inductors 38a–d. This state may be maintained until the voltage at the input terminal 62 becomes greater than the voltage at the input terminal 64, at which time the output of the comparator 60 transitions "low" and the switch 80 is unbiased, whereupon control is effectively returned to the control circuit 14. Thus, with the transient override circuit 18 of the present invention, when the load current changes rapidly, the current in the output inductors 38a–d of the power converter 16 is increased very quickly to a level close to the full load value, and when the transient override circuit 18 disengages, the control circuit 14 restores the desired output voltage.

The minimum rate of the output voltage decline necessary to trigger the transient override circuit 18 may be set by the time constant of the delay circuit 72. In addition, the minimum magnitude of the change in the output voltage may be set by the value of the resistors 68, 70 of the resistor network 66 and the voltage level of the voltage rail $V_1$.

Figure 3:
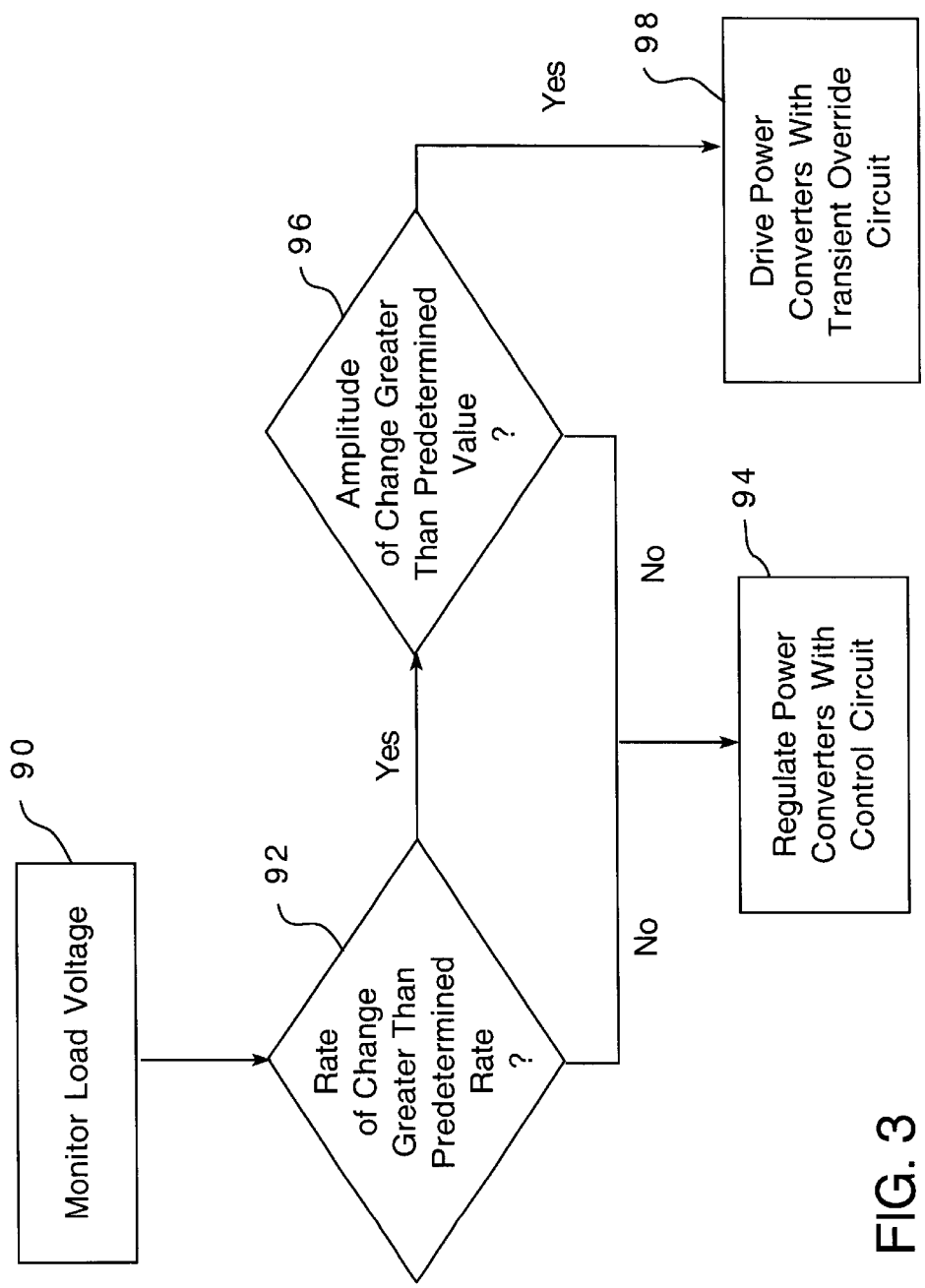
FIG. 3 is a block diagram of a method according to one embodiment of the present invention.

FIG. 3 is a block diagram, illustrating the process flow of a method of providing a regulated load voltage to the load 12 according to one embodiment of the present invention. The method starts at block 90, where the load voltage is monitored. From block 90, the process proceeds to block 92, where it is determined whether the rate of decline in the load voltage is greater than a predetermined rate. As discussed hereinbefore, according to one embodiment, this function may be performed by the transient override circuit 18. In addition, as discussed hereinbefore, the predetermined rate may be established according to the time constant for the delay circuit 72.

If the rate of decline of the load voltage does not exceed the predetermined rate, the process flow advances to block 94, where the PWM control circuit 14 regulates the switching of the pulse-width modulated switching devices of the power converter 16 to achieve the desired output voltage. If, however, the rate of decline of the load voltage does exceed the predetermined rate, the process flow advances to block 96, where it is determined whether the magnitude of the load voltage change is greater than a predetermined value. As discussed hereinbefore, according to one embodiment, this function may be performed by the transient override circuit 18. In addition, as discussed hereinbefore, the predetermined value may be established according to the values of the resistors 68, 70 of the resistor network 66 and the value of the voltage rail $V_1$.

If the load voltage change is not greater than the predetermined value, the process flow advances to block 94, where the PWM control circuit 14 regulates the switching devices of the power converter 16 to achieve the desired output voltage. Conversely, if the load voltage change is greater than the predetermined value the process advances to block 98, where the pulse-width modulated, switching devices of the power converter 16 are driven by the transient override circuit 18, as discussed hereinbefore, to ramp up the current through the output inductors 38a–d. The transient override circuit 18 may continue to drive the power converter 16 until one of the conditions of blocks 92 and 96 ceases to exist.

Although the present invention has been described herein with respect to certain embodiments, those of ordinary skill in the art will recognize that many modifications and variations of the present invention may be implemented. For example, according to another embodiment of the present invention, the transient override circuit 18 may override the control circuit 14 for a predefined period of time before relinquishing control back to the control circuit 14, rather than relinquishing control after one of the conditions which caused engagement of the transient override circuit 18 ceases to exist. In addition, many modifications to the transient override circuit 18 may be made while still realizing the benefits of the present invention. The foregoing description and the following claims are intended to cover all such modifications and variations.

What is claimed is:

1. A circuit for providing a regulated voltage to a load, comprising:

a power converter for coupling to the load and including at least one pulse-width modulated switching device;

a control circuit for providing a pulse-width modulated control signal to the pulse-width modulated switching device of the power converter based on an output voltage of the power converter; and a transient override circuit responsive to a load voltage for overriding the control circuit during certain load voltage conditions by biasing the pulse-width modulated switching device conductive only when both a rate of change of the load voltage exceeds a predetermined rate and a magnitude of the change in the load voltage exceeds a predetermined voltage.

2. The circuit of claim 1, wherein the power converter includes a synchronous buck converter.

3. The circuit of claim 2, wherein the power converter includes four interleaved synchronous buck converters, each including a pulse-width modulated switching device.

4. The circuit of claim 3, wherein the transient override circuit is for biasing each of the pulse-width modulated switching devices of the synchronous buck converters conductive when a rate of change of the load voltage exceeds a predetermined rate and when a magnitude of the change of the load voltage exceeds a predetermined voltage.

5. The circuit of claim 1, wherein the transient override circuit is for overriding the control circuit by biasing the switching device such that the switching device does not turn off during the time period that the transient override circuit overrides the control circuit.

6. The circuit of claim 5, wherein the transient override circuit includes a comparator having a first input terminal responsive to an average of the load voltage.

7. The circuit of claim 6, wherein the comparator includes a second input terminal responsive to an offset of the load voltage.

8. A circuit for providing a regulated voltage to a load, comprising:
 a power converter for coupling to the load and including at least one pulse-width modulated switching device;
 a pulse-width modulated control circuit responsive to an output voltage of the power converter and having an output terminal connected to a control terminal of the pulse-width modulated switching device of the power converter; and
 a transient override circuit responsive to a load voltage and having an output terminal connected to the control terminal of the pulse-width modulated switching device of the power converter, wherein the transient override circuit is for overriding the pulse-width modulated control circuit during certain load voltage conditions such that the pulse-width modulated switching device is biased conductive only when both a rate of change of the load voltage exceeds a predetermined rate and a magnitude of the change in the load voltage exceeds a predetermined voltage.

9. The circuit of claim 8, wherein the transient override circuit includes a comparator having a first input terminal connected to a first input terminal of the load via a resistor network, a second input terminal responsive to the load voltage via a delay circuit, and an output terminal connected to a control terminal of the pulse-width modulated switching device of the power converter.

10. The circuit of claim 9, wherein the resistor network includes:
 a first resistor connected between the first input terminal of the load and the first input terminal of the comparator; and
 a second resistor connected between the first input terminal of the load and a first voltage rail.

11. The circuit of claim 10, wherein the delay circuit includes:
 a third resistor connected between the first input terminal of the load and the second input terminal of the comparator; and
 a capacitor connected between a second input terminal of the load and the second input terminal of the comparator.

12. The circuit of claim 8, wherein the power converter includes four interleaved synchronous buck converters, each including a pulse-width modulated switching device.

13. The circuit of claim 12, wherein the transient override circuit is for biasing each of the pulse-width modulated switching devices of the synchronous buck converters conductive when a rate of change of the load voltage exceeds a predetermined rate and when a magnitude of the change in the load voltage exceeds a predetermined voltage.

14. The circuit of claim 8, wherein the transient override circuit is for overriding the control circuit by biasing the switching device such that the switching device does not turn off during the time period that the transient override circuit overrides the control circuit.

15. The circuit of claim 14, wherein the transient override circuit includes a comparator having a first input terminal responsive to an average of the load voltage.

16. The circuit of claim 15, wherein the comparator includes a second input terminal responsive to an offset of the load voltage.

17. A circuit for providing a regulated voltage to a load, comprising:
 a power converter for coupling to the load and including at least one pulse-width modulated switching device;
 a control circuit for providing a pulse-width modulated control signal to the pulse-width modulated switching device of the power converter based on an output voltage of the power converter; and
 means for overriding the control circuit during certain load voltage conditions by biasing the pulse-width modulated switching device conductive only when both a rate of change of the load voltage exceeds a predetermined rate and a magnitude of the change in the load voltage exceeds a predetermined voltage.

18. The circuit of claim 17, wherein:
 the power converter includes four interleaved synchronous buck converters, each including a pulse-width modulated switching device; and
 the means for overriding includes means for overriding the control circuit by biasing each of the pulse-width modulated switching devices conductive when the rate of change of the load voltage exceeds the predetermined rate and when the magnitude of the change in the load voltage exceeds the predetermined voltage.

19. The circuit of claim 17, wherein the means for overriding the control circuit further includes overriding the control circuit by biasing the switching device such that the switching device does not turn off during the time period that the transient override circuit overrides the control circuit.

20. The circuit of claim 19, wherein the means for overriding the control circuit includes a comparator having a first input terminal responsive to an average of the load voltage.

21. The circuit of claim 20, wherein the comparator includes a second input terminal responsive to an offset of the load voltage.

* * * * *